United States Patent Office 3,207,574
Patented Sept. 21, 1965

3,207,574
BRIQUETTING OF SODIUM CYANIDE
Felix B. Popper, Shawinigan, Quebec, Canada, assignor to Shawinigan Chemicals Limited, Montreal, Quebec, Canada, a corporation of Canada
No Drawing. Filed Oct. 19, 1961, Ser. No. 146,327
4 Claims. (Cl. 23—79)

This invention relates to the production of sodium cyanide and is more particularly concerned with improving the briquettability of spray-dried sodium cyanide powder.

The principal object of the invention is the provision of a process for producing sodium cyanide briquets which have good mechanical strength. Such briquets will not break, for example, when struck by a test weight falling from a height of several inches.

Sodium cyanide with 400 to 500 parts per million (p.p.m.) of iron is commercially acceptable for several industrial uses; hitherto a relationship between iron content and briquettability has not been suspected. It has now been found that it is highly desirable, in order to produce strong briquets of sodium cyanide from spray-dried sodium cyanide powder, to limit the iron content of the sodium cyanide to an amount less than 200 p.p.m., preferably no greater than 100 p.p.m., and most preferably to less than 60 p.p.m.

The invention therefore consists in a process for producing briquets of solid sodium cyanide from an aqueous solution of sodium cyanide by spray drying the aqueous solution to evaporate the water therefrom and form a dry sodium cyanide powder and compacting the powder into shaped briquets, characterized in that the iron content of the sodium cyanide solution is controlled to produce a sodium cyanide powder containing less than 200 parts per million of iron, whereby the mechanical strength of the resultant briquets is substantially increased.

There are several commercial processes for producing sodium cyanide. In the Castner process, sodium cyanide is produced by reacting sodamide with carbon, the sodamide having been formed from metallic sodium and ammonia. Among the commercial processes for the production of gaseous hydrogen cyanide is the Andrussow process, in which ammonia, hydrocarbons and oxygen react in the presence of a platinum group catalyst. In a more recent commercial process, described in U.S. Patent 2,958,584, to Johnson and Andersen, ammonia and hydrocarbons are reacted to form hydrogen cyanide in an electrically heated fluidized bed. Gaseous hydrogen cyanide can be converted into sodium cyanide in aqueous solution by passing the gas into an aqueous solution of sodium hydroxide.

Aqueous solutions of sodium cyanide can be spray-dried by spraying the solution into a drying chamber in which it is contacted with hot air at essentially atmospheric pressure to form a substantially dry powder of sodium cyanide. The powder of sodium cyanide thus formed can be compressed into briquets of various shapes by a briquetting machine.

A suitable briquetting machine may contain for example depressions or dies around the circumferences of two rolls which have parallel axes in a horizontal plane, which rolls touch each other along one line on their circumference, and which rotate to compress material dropped on them from above. A screw conveyor can be positioned to convey the sodium cyanide powder to the dies. The rate of rotation of the screw conveyor can be controlled within a desired range, such as a selected rate between 50 to 200 r.p.m., for example. In the case of tapered screw conveyors, the sodium cyanide powder will be compressed or compacted as the powder is carried to the briquetting rolls. The compacting ratio of a given screw conveyor may be defined as the ratio of the free surface area at the entrance (or top) of the tapered screw to that at the exit (or bottom) of the tapered screw.

The mechanical strength or impact strength of shaped briquets can conveniently be indicated by the height in inches from which a specified weight can fall on the briquets without breaking them, the heights of successive falls being increased by one inch increments over the height of each previous fall and the impacts being continued until the briquet under test cracks or breaks. Dried briquets have a greater strength than freshly formed ("green") briquets.

It has now been found that if the iron content of the spray-dried sodium cyanide powder is below 100 p.p.m., it is possible to form therefrom perfectly-shaped briquets which have high mechanical strength. When the sodium cyanide powder contains between about 100 to 200 p.p.m. of iron, briquets formed from the powder are discharged from the rolls as complete briquets, but these briquets generally show meridional cracks. When sodium cyanide powder of iron content greater than 200 p.p.m. is compressed between briquetting rolls, the powder drops from the rolls as soft aggregates which break up readily.

It was found by tests that other possible impurities which might affect briquettability, for example sodium formate, sodium sulfide, sodium hydroxide, ammonia, and hydrogen cyanide polymer, in fact had no appreciable effects on the strengths of briquets made from spray-dried sodium cyanide.

The effects of iron in the form of sodium ferrocyanide on the briquettability of spray-dried sodium cyanide powder are shown in Experiments 1–10.

In Experiments 1–4 and 7–9, which are described below, iron was added to the sodium cyanide solutions in the form of sodium ferrocyanide, it having been established that iron added to said solutions in any other common form will be completely converted into ferrocyanide.

In Experiments 1–5, sodium cyanide prepared by the Castner process and cast into molds from the molten product was dissolved in water, and varying amounts of sodium ferrocyanide, as indicated in Table I, were added to the solutions. Each solution was then spray-dried, the spray-dried powder was shaped into briquets in a briquetting machine, and the impact strengths and densities of the briquets, both before and after drying, were measured.

The screw feeder which fed the spray-dried sodium cyanide powder to the briquetting machine had a compacting ratio of 2 to 1 and a controllable speed of rotation up to 170 r.p.m. The briquetting rolls each had a diameter of 20.5 inches and rotated at 6.6 r.p.m. The briquets as formed were pillow-shaped, 1.75 x 1.5 inches and 0.75 inch thick. The sodium cyanide powder during briquetting had a temperature of about 80° C. The briquetting rolls were lubricated with a small quantity of hot water.

The mechanical strength of a briquet was determined by dropping a 200 gram weight upon it from successive heights increased by one inch until the briquet finally was broken. The strengths shown in Table I are the averages of tests with three briquets.

The briquet density was determined by finding the volume of xylene displaced by a shellacked briquet. Each density result given in Table I is the mean of two determinations.

In experiments 6–10, sodium cyanide, prepared by the absorption in caustic soda solutions of hydrogen cyanide formed from ammonia and hydrocarbons, was dissolved in water and various amounts of sodium ferrocyanide were added to the solutions which were then spray-dried and briquetted as described above. The impact strengths and densities of the green and dried briquets are shown in Table I.

*Table I*

| Expt. No. | Addition of Sodium Ferrocyanide to Solution, percent | Fe in Feed, p.p.m. on NaCN | Screw Feeder, r.p.m. | Green Briquets | | Dried Briquets | |
|---|---|---|---|---|---|---|---|
| | | | | Impact Strength (inches) | Density, g./cc. | Impact Strength (inches) | Density, g./cc. |
| 1 | 0.218 | 284 | 88 | 3.3 | 1.24 | 4.0 | 1.27 |
| 2 | 0.0436 | 82 | 88 | 4.7 | 1.31 | 7.7 | 1.31 |
| 3 | 0.0218 | 57 | 88 | 5.7 | 1.22 | 9.0 | 1.29 |
| 4 | 0.0091 | 42 | 88 | 5.3 | 1.25 | 11.6 | 1.25 |
| 5 | 0 | 32 | 88 | 12.0 | 1.33 | 21.0 | 1.38 |
| 6 | 0 | 200 | 88 | 1.0 | 1.21 | 5.0 | 1.13 |
| 7 | 0.085 | 161 | 136 | 6.0 | 1.28 | 7.3 | 1.25 |
| 8 | 0.0444 | 113 | 88 | 6.3 | 1.28 | 8.7 | 1.29 |
| 9 | 0.0435 | 112 | 118 | 5.0 | 1.27 | 9.7 | 1.29 |
| 10 | 0 | 50 | 88 | 5.3 | 1.29 | 13.3 | 1.34 |

The deleterious effect of iron on the briquettability of spray-dried sodium cyanide is demonstrated in Table I, where the trend of improvement of briquets with reduction in iron content is very pronounced. The iron tolerance of the Castner type product is quite low, green strengths of above 6 inches being obtained only for briquets with an iron content below 40 p.p.m. The main impurity in sodium cyanide produced by the Castner process is sodium cyanate. The main impurities in sodium cyanide produced by ammonia-hydrocarbon processes are generally sodium formate and sodium carbonate, while sodium cyanate is practically absent. The somewhat lower iron tolerance of Castner-type sodium cyanide suggests a synergistic effect of the iron with one of the other impurities.

The iron content of sodium cyanide solutions can be kept below the desired level (60, 100, or 200 p.p.m.) by avoiding the use of mild steel or cast iron in contact with the solutions, by using a rayon grade (low iron content) caustic soda, and by using a water supply with a low iron content. Water used for the sodium cyanide solutions should preferably contain an iron content below 10–20 p.p.m. Where the water supply contains dissolved or suspended iron above 10–20 p.p.m., the iron should be removed by precipitation, ion exchange, or other known method.

The scope of the invention is defined by the following claims.

What is claimed is:

1. A process for producing briquets of solid sodium cyanide by supplying hydrogen cyanide, sodium hydroxide and water to the process of produce sodium cyanide in aqueous solution, spray drying the aqueous solution to evaporate the water therefrom and form a dry sodium cyanide powder and compacting the powder into shaped briquets, characterized in that the iron content of the sodium cyanide solution is controlled to produce a sodium cyanide powder containing less than 200 parts per million of iron, whereby the mechanical strength of the resultant briquets is substantially increased.

2. A process as claimed in claim 1, in which the iron content of the sodium cyanide powder is maintained below 100 parts per million.

3. A process as claimed in claim 1, in which the iron content of the resultant briquets is controlled by supplying to the process water which contains less than 10 parts per million of iron.

4. In a process of producing briquets of solid sodium cyanide by supplying hydrogen cyanide, sodium hydroxide and water to the process to produce sodium cyanide in aqueous solution, spray drying the aqueous solution to evaporate the water therefrom, thereby forming a dry sodium cyanide powder, and compacting the powder into shaped briquets, the improvement which consists of controlling the iron content of the sodium cyanide solution to produce a sodium cyanide powder containing less than 200 parts per million of iron, whereby the mechanical strength of the resultant briquets is substantially increased.

References Cited by the Examiner

UNITED STATES PATENTS

| 912,538 | 2/09 | Bueb | 23—79 X |
| 2,949,341 | 8/60 | Green | 23—79 |

FOREIGN PATENTS 540,062 10/41 Great Britain.

MAURICE A. BRINDISI, *Primary Examiner.*